United States Patent
Bellows et al.

(10) Patent No.: US 7,667,151 B2
(45) Date of Patent: Feb. 23, 2010

(54) ARRANGEMENT INCLUDING RIGID HOUSING AND DISPLAY

(75) Inventors: David Bellows, Wantagh, NY (US); Eric M. Johnson, Brooklyn, NY (US); Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 440 days.

(21) Appl. No.: 11/172,528

(22) Filed: Jun. 30, 2005

(65) Prior Publication Data
US 2007/0000764 A1   Jan. 4, 2007

(51) Int. Cl.
*H01H 9/00* (2006.01)

(52) U.S. Cl. .................. 200/310; 200/296; 200/293; 345/179; 345/182; 340/825.69; 379/433.01

(58) Field of Classification Search ............... 200/310, 200/600, 293, 296; 345/173–174, 179, 182–183; 340/825.69; 379/428, 433.01
See application file for complete search history.

(56) References Cited

U.S. PATENT DOCUMENTS 6,459,460 B1   10/2002   Yamanaka

FOREIGN PATENT DOCUMENTS

| EP | 1143687 | 10/2001 |
|---|---|---|
| WO | 95/21441 | 8/1995 |
| WO | 99/67702 | 12/1999 |
| WO | 03/001775 | 1/2003 |
| WO | 2004/062143 | 7/2004 |
| WO | WO2007/005149 | 1/2007 |

OTHER PUBLICATIONS

International Search Report dated Sep. 27, 2006 in related case PCT/US2006/020500.
International Preliminary Report on Patentability dated Jan. 9, 2008 in related case PCT/US2006/020500.
Office Action dated Dec. 4, 2008 in related case EP 06 760 433.0 - 2414.

*Primary Examiner*—Kyung Lee

(57) ABSTRACT

Described is a device including a housing and a display arrangement. The housing is integrally formed (i.e., a single-piece housing) and has a predefined substantially transparent area. The housing has also at least one opening. The display arrangement is situated inside of the housing and is inserted into the housing through the opening and aligned with the predefined area.

20 Claims, 6 Drawing Sheets

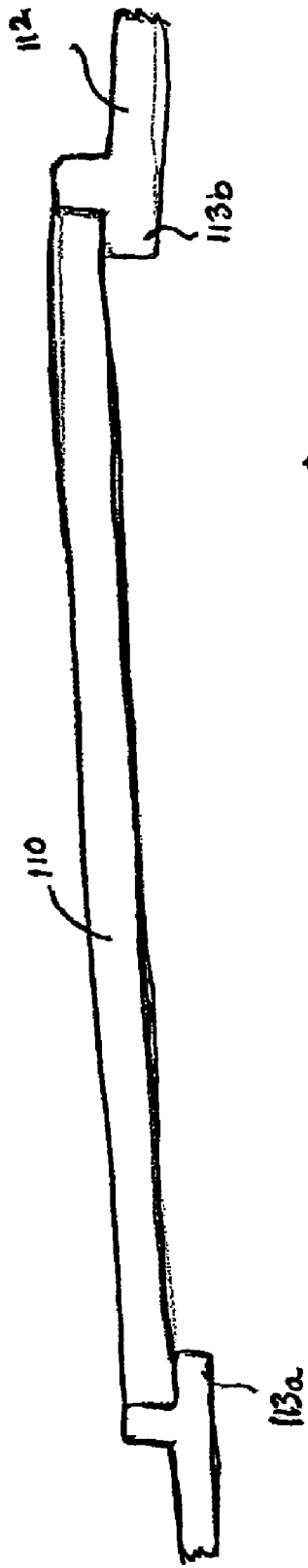
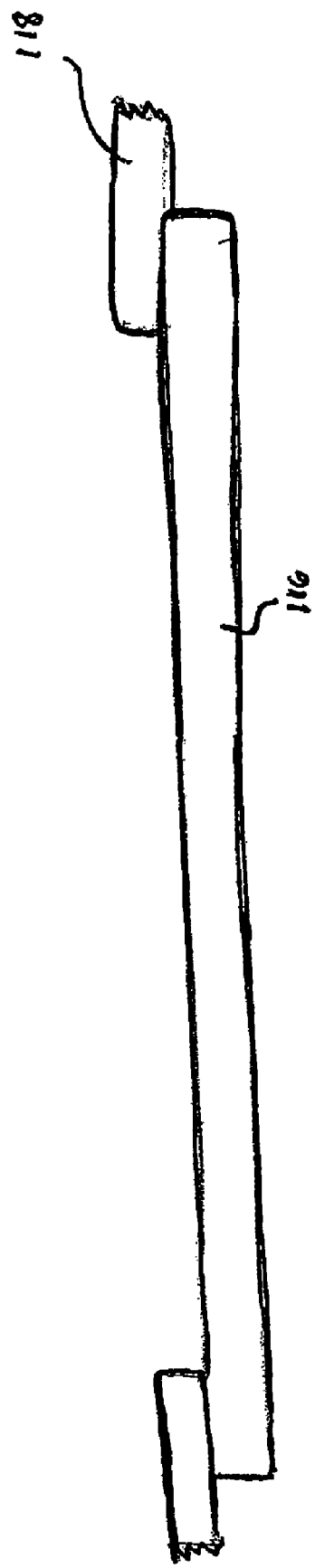
Fig 1a. (Prior Art)
Fig 1b. (Prior Art)

ARRANGEMENT INCLUDING RIGID HOUSING AND DISPLAY

BACKGROUND

In recent times, mobile devices, such as personal digital assistants (PDAs), cell phones, etc., have gained wide recognition and acceptance. A user typically carries the mobile device throughout the performance of his daily routines (e.g., travel to/from work). Accordingly, a housing for the mobile device is rugged to protect inner electronics from damage. Such damage may result from everyday wear and/or dropping/mishandling the device. However, conventional methods of increasing a strength of the housing typically necessitate increasing a volume of the housing, leading to negative effects of reducing a space available for encasing the electronics and increasing an overall size of the housing which decreases/hinders portability.

The mobile device is generally assembled by enclosing the inner electronics, such as a Central Processing Unit (CPU) board, display, keyboard, and internal wiring, within the housing. The housing normally includes an upper portion and a lower portion, where large sections of the upper portion are removed in order to allow users to access the display and/or keyboard. However, removal of the large sections results in a significant loss of structural rigidity. As such, the mobile device is more susceptible to damage.

Another problem inherent in assembly of the mobile device relates to durability of a touch panel included therein. FIGS. 1a and 1b illustrate conventional integrations of the touch panel and the housing. As shown in FIG. 1a, a touch panel 110 rests on top of two short ledges 113a and 113b extending from a housing 112. In FIG. 1b a touch panel 116 is affixed to an underside of a housing 118. In each integration, only a small portion (e.g., an outer edge) of the touch panel is affixed to the housing. Due to a lack of support and a continual intermittent pressure exerted upon the touch panel in everyday usage, the touch panel may become dislodged, wear, bend or crack.

SUMMARY OF THE INVENTION

The present invention relates to a device which may include housing and a display arrangement. The housing is integrally formed (i.e., a single-piece housing) and has a predefined substantially transparent area. The housing has also at least one opening. The display arrangement is situated inside of the housing and is inserted into the housing through the opening and aligned with the predefined area.

BRIEF DESCRIPTION OF THE DRAWINGS

FIG. 1a shows a conventional integration of a touch panel and a mobile device housing;

FIG. 1b shows another conventional integration of a touch panel and a mobile device housing;

FIG. 4 shows a side view of the mobile device shown in FIG. 3a; and

DETAILED DESCRIPTION

Figure 2:
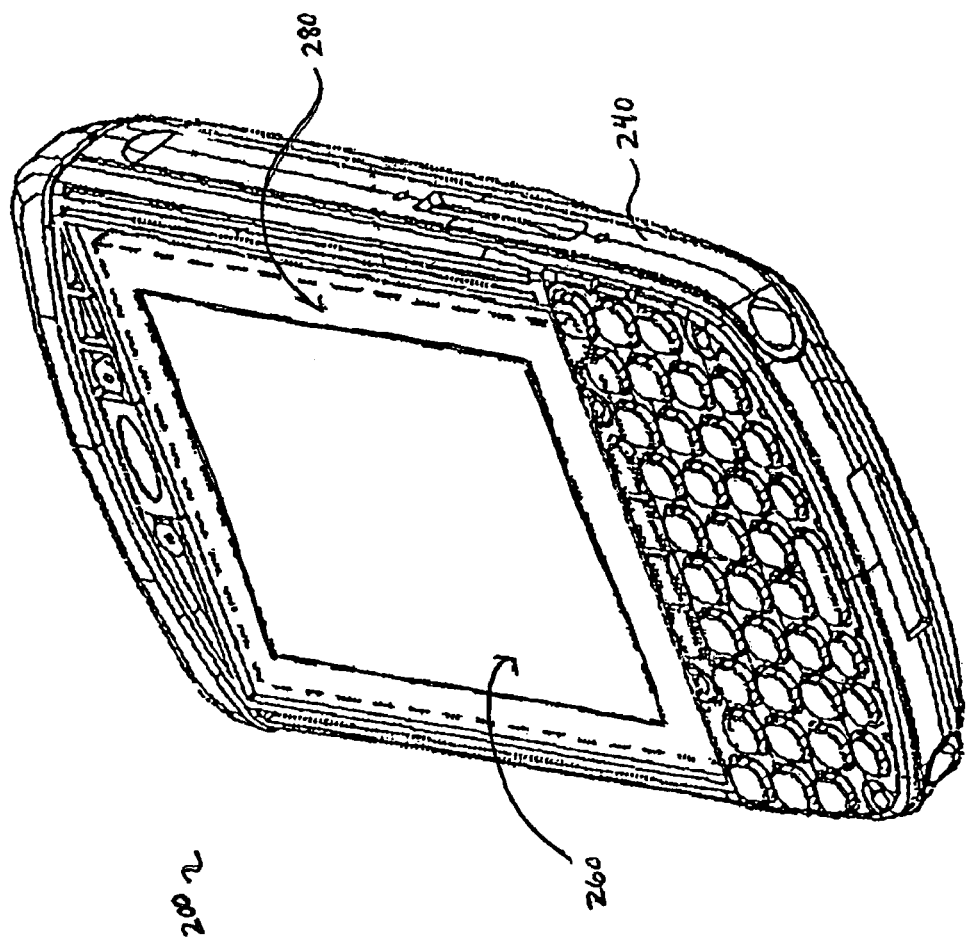
FIG. 2 shows an exemplary embodiment of a mobile device having a display arrangement according to the present invention.

The present invention may be further understood with reference to the following description and the appended drawings, wherein like elements are referred to with the same reference numerals. The present invention will be described with reference to a touch panel utilized in a mobile device (e.g., a PDA, a palm sized personal computer, a cellular telephone, a global positioning system (GPS), a bar code scanner, a digital imager, a radio frequency identification (RFID) device, etc.). However, those skilled in the art will understand that the integrations according to the present invention are equally suited for any electronic device utilizing the touch panel, including stationary computing devices such as printers, copy machines, touch panel monitors, etc.

As shown in FIG. 2, a mobile device ("MD") 200 may include a monocoque housing 240, which may be substantially formed from one piece of material. In an alternative embodiment of the present invention, more than one pieces of material may be used to form the housing 240. For example, the housing 240 may be manufactured as two halves of material which are affixed together upon assembly. The housing 240 may be manufactured utilizing, for example, an injection molding process, blow molding, compression molding, or extrusion molding. In one exemplary embodiment, the housing 240 may also be substantially transparent to enable a user to view components which are encased therein. In another embodiment, a predefined area of the housing 240 may be at least substantially transparent, while a remaining portion is opaque. The material forming the housing 240 and at least the predefined area may be, for example, a Polycarbonate (e.g., GE Lexan® 141), a Lucite, an Acrylic, a Perspex® or any combination thereof. Those of skill in the art will understand that the material used to form the housing 240 and at least the predefined area may be any other substantially rigid material which is sufficiently transparent, as will be described below.

The housing 240 may encase a number of internal components (i.e., circuitry) of the MD 200. The circuitry can include an address/data bus for communicating information, a processor coupled with the bus for processing information and instructions, a volatile memory (e.g., random access memory) coupled to the bus for storing information and instructions for the processor and/or a non-volatile memory (e.g., read only memory) coupled to the bus for storing static information and instructions for the processor. The MD 200 may further include a data storage device (e.g., a memory stick) coupled with the bus for storing information and instructions.

The MD 200 further includes a display arrangement, such as a display 280 (e.g., a liquid crystal display ("LCD")) and, optionally, a touch panel 260. In one embodiment of the present invention, the display 280 is located inside the housing 240. The touch panel 260 may be external to the display 280 and inside of the housing 240 and receive a contact by the user. In an alternative exemplary embodiment of the present invention, the display 280 may be external to the touch panel 260. In another exemplary embodiment, the touch panel 260 may be located outside of the housing 240. The touch panel may be electrically coupled to the circuitry of the MD 200. Accordingly, as the touch panel receives the contact, the processor detects the contact and determines an exact location thereof. Further, the processor may determine how the contact corresponds to an image being portrayed on the display 280, and whether a predetermined event should be executed as a result of the contact and the image. For example, the display 280 may output the image depicting a plurality of boxes, each representing a unique predetermined function.

The user may select the function by touching the corresponding box by hand or using a stylus. The processor determines the exact location of the contact, and, in view of the image on the display 280, executes the corresponding predetermined function.

Several different systems for detecting a point of contact exist including, but not limited to, a resistive system, a capacitive system, an inductive system, and a surface wave acoustic system. The resistive system includes a conductive metallic layer and a resistive metallic layer which are held apart by spacers. The two layers make contact in an exact location of a user contact enabling a transfer of an electrical current therebetween, and the exact location may thus be identified. The capacitive system includes a capacitive layer which stores an electrical charge. Human touch transfers the charge from the layer to a user's finger, thereby reducing the charge on the capacitive layer. The reduction in charge may be utilized to calculate the exact location of the touch. The inductive system includes a magnetic field above the surface. When a special stylus is placed in the magnetic field, a strength of the field changes, and the location of the stylus may therefore be identified. The surface wave acoustic system includes two pairs of a transducer and a reflector, each of which reflect an electrical signal sent by the transducer. Each transducer is able to determine whether the signal has been disturbed by the contact and can locate it accordingly.

The touch panel 260 used in conjunction with the MD 200 may be fully supported by the housing 240. That is, the touch panel 260 may rest flat against an outer surface of the housing 240, external to the display 280. In an alternative embodiment, the touch panel 260 may lie inside the housing 240. Because at least the predefined area of the housing 240 is transparent, it is preferable that the display 280 aligns therewith, enabling the user to view the display 280. The touch panel 260 may then be affixed to the housing 240 over or under the predefined area. Further, because the housing 240 may fully cover the display 280 and other internal components of the MD 200, an entire surface of the touch panel may be supported thereby. Accordingly, the MD 200 detects the contact as described above, but damage to the touch panel due to flexure induced by the contact is negligible.

Figure 3A:
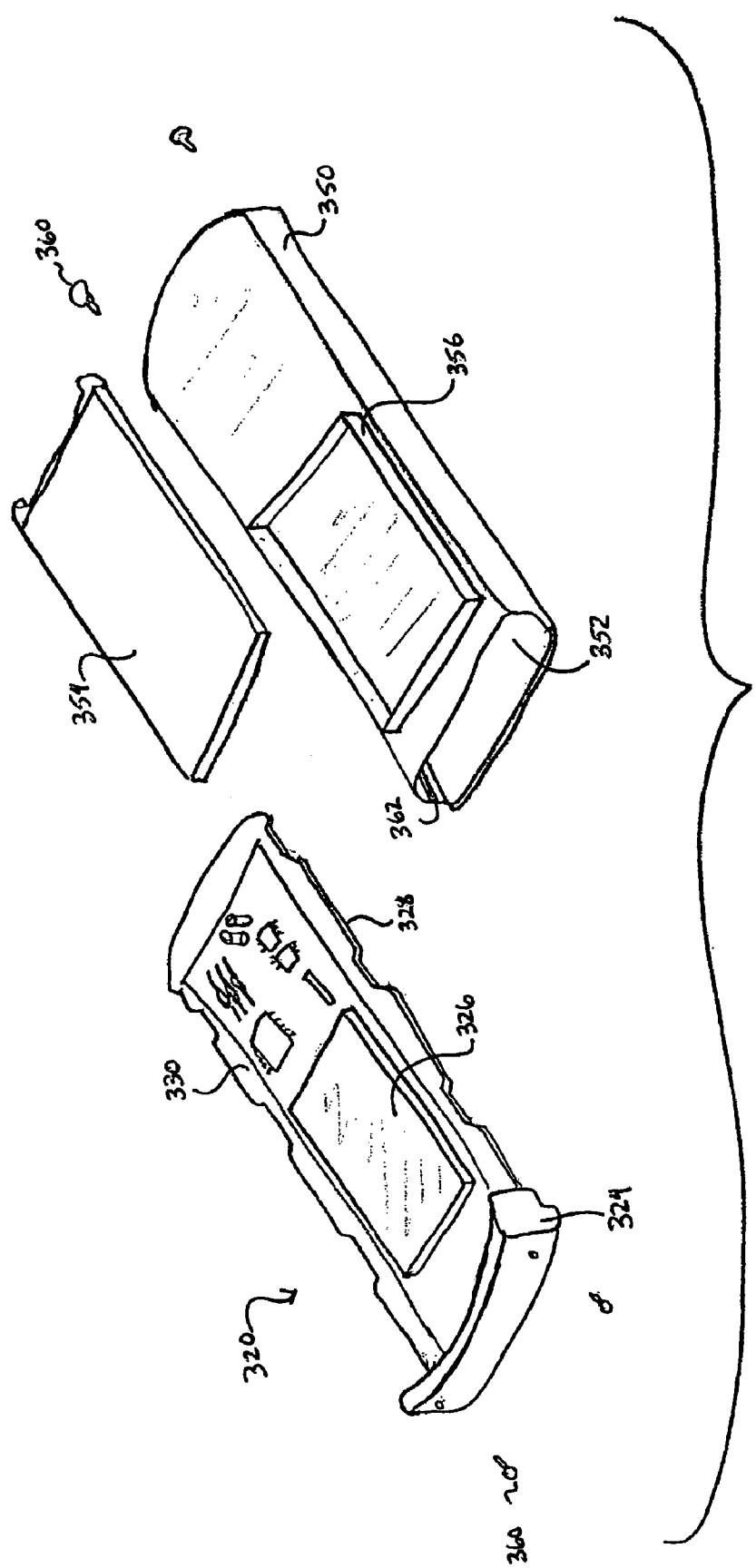
FIG. 3a shows an exemplary embodiment of an integration of the mobile device and the display arrangement according to the present invention.

FIG. 3a portrays an exemplary embodiment of an integration of the display arrangement and the MD 200. A housing 350 may be manufactured from one piece of material having at least a predefined area which is transparent. The housing 350 has an opening 352 into which a rail system 320 may be inserted. Although the opening 352 is illustrated as being located near a top portion of the housing 350, this opening 352 could alternatively be located at any other portion of the housing 350, such as a bottom or a side. The housing 350 may further include a wall structure 356 extending from an outer surface in which a touch panel 354 may be received. When the touch panel 354 is coupled to the housing 350, the wall structure 356 surrounds the touch panel 354 providing additional support thereto, preventing movement of the touch panel 354 along the outer surface of the housing 350. The touch panel 354 may be secured to the housing 350 by adhesive, mechanical fasteners, or a cover/bezel as will be described below with respect to FIG. 3b. User contact with the touch panel 354 is transmitted to a CPU of the MD 200.

As shown, the rail system 320 contains substantially all of the internal components of the MD 200, including conventional circuitry. Also included in the rail system 320 is a display 326, such as an LCD, a cathode ray tube (CRT), a field emission device (FED, or flat panel CRT), or any other display suitable for generating images and/or alphanumeric characters recognizable to the user.

The rail system 320 comprises a stack 330 which may be formed of any material, such as plastic or metal. In one embodiment, the stack 330 may be formed of magnesium because of its light weight and abundant availability. The stack 330 is preferably a thin, flat structure. Along each side of the stack 330 is a rail 328. The rails 328 complement racks 362 located inside the housing 350 for receiving the rail system 320 therein and to additionally provide secure and stable placement of the circuitry. As the rail system 320 is inserted into the opening 352 of the housing 350, the display 326 should be substantially aligned with the touch panel 354 and the wall structure 356. In an embodiment where only the predefined area of the housing 350 is transparent, the display 326 should also be aligned therewith.

Once the rail system 320 is inserted into the housing 350, a cap 324 covering the opening 352 completes encapsulation of the MD 200. The assembled terminal may then be secured by any conventional method (e.g., mechanically, welding, adhesive, etc.). As shown in FIG. 3a, screws 360 may be used to secure each of a proximal and a distal end of the housing 350. Accordingly, the screws 360 may penetrate the cap 324 through to the proximal end of the housing 350. Similarly, the screws 360 may penetrate the distal end of the housing 350 through to the rail system 320. Although a total of four screws is illustrated in this embodiment, it will be understood that any number of screws may be used to secure the assembled components of the mobile terminal. It will be similarly understood that these screws 360 may be variably placed along the surface of the housing 350, as opposed to limited placement at a proximal and distal end.

Figure 3B:
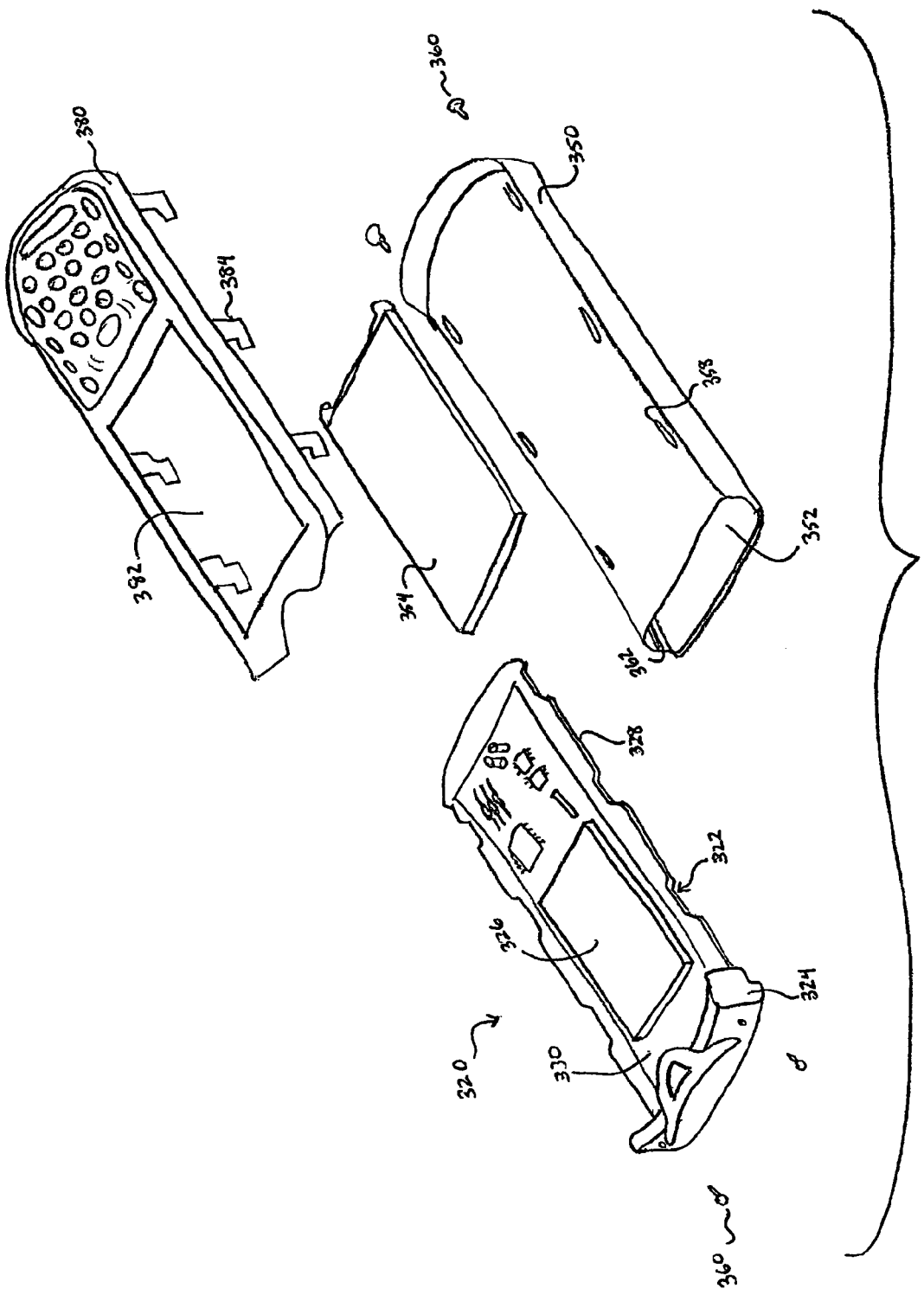
FIG. 3b shows another exemplary embodiment of an integration of the mobile device and the display arrangement according to the present invention.

Referring to FIG. 3b, another embodiment of the present invention further includes a cover/bezel 380. The cover/bezel 380 may provide additional security to the components of the MD 200. The cover/bezel 380 may secure the touch panel 354 in place. Alternatively or additionally, the touch panel 354 may be secured with adhesive, mechanical fasteners, etc. The cover/bezel 380 contains a cutout 382, which may be sized in accordance with the touch panel 354. The cutout 382 allows a user to access the touch panel 354. The cover/bezel 380 also includes one or more male members 384 which are received by corresponding holes 358 on the housing 350. The stack 330 also includes notches 322 created in a side thereof which correspond to the holes 358. The notches 322 allow the male members 384 to hook under the stack 330. Thus, the male members 384 also serve to secure the rail system 320 in place. Similar to the embodiment of FIG. 3a, the assembled components may then be permanently affixed to the housing 350.

Figure 4:
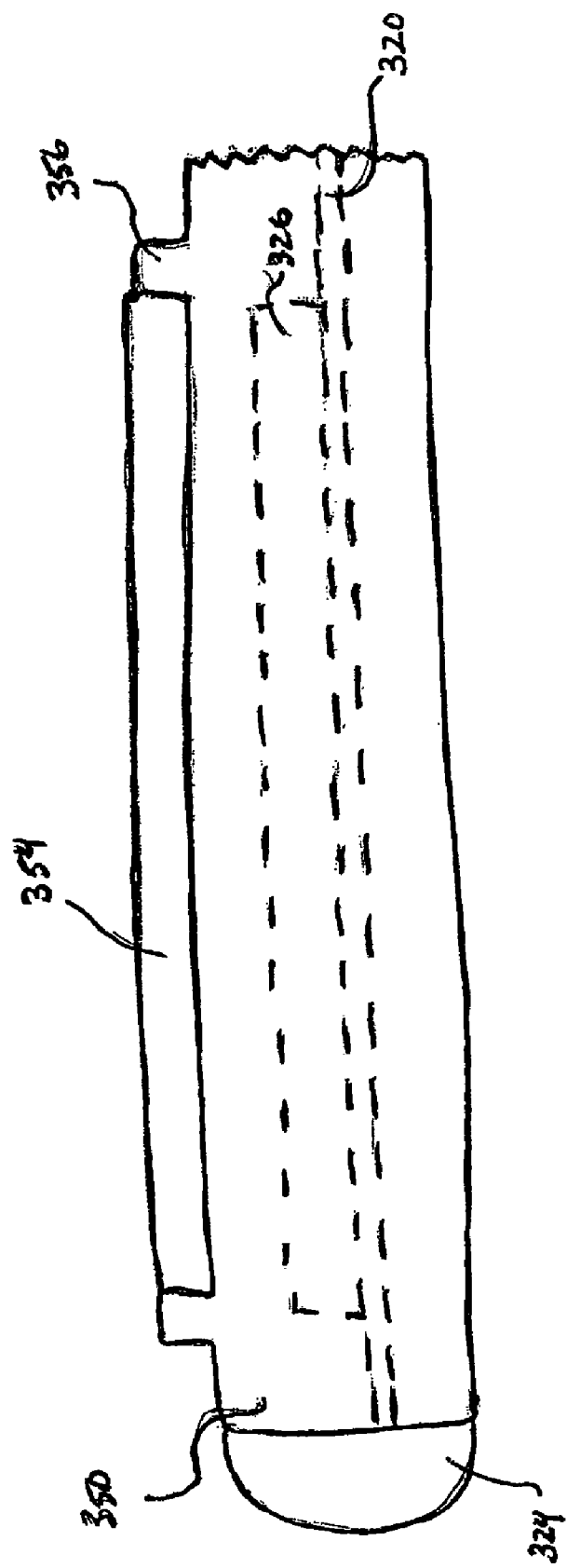

As shown in FIG. 4, the housing 350 encases the rail system 320 and the display 326. The touch panel 354, sized in accordance with the display 326 and the wall structure 356, is aligned therewith. According to an embodiment of the present invention, the display 326 may be placed flush against an inner surface of housing 350 to provide the clearest possible image to a user. Alternatively, it may be desired to leave an amount of space between the display 326 and the housing 350.

FIG. 4 illustrates the support provided to the touch panel 354 by the housing 350. An underside of the touch panel 354 lies flush against the outer surface of the housing 350. Because, in one embodiment, the housing 350 is monocoque, an entire surface area of the underside of the touch panel 354 is in contact with the outer surface of the housing 350. As pressure is exerted upon the touch panel 354, the contact may be accurately registered by the processor of the MD 200. However, the pressure will not fatigue the touch panel 354 or cause it to bend, cave, crack, break, etc. Therefore, the touch panel 354 may endure a greater number of contacts, and in turn may last for a longer period of time.

Figure 5:
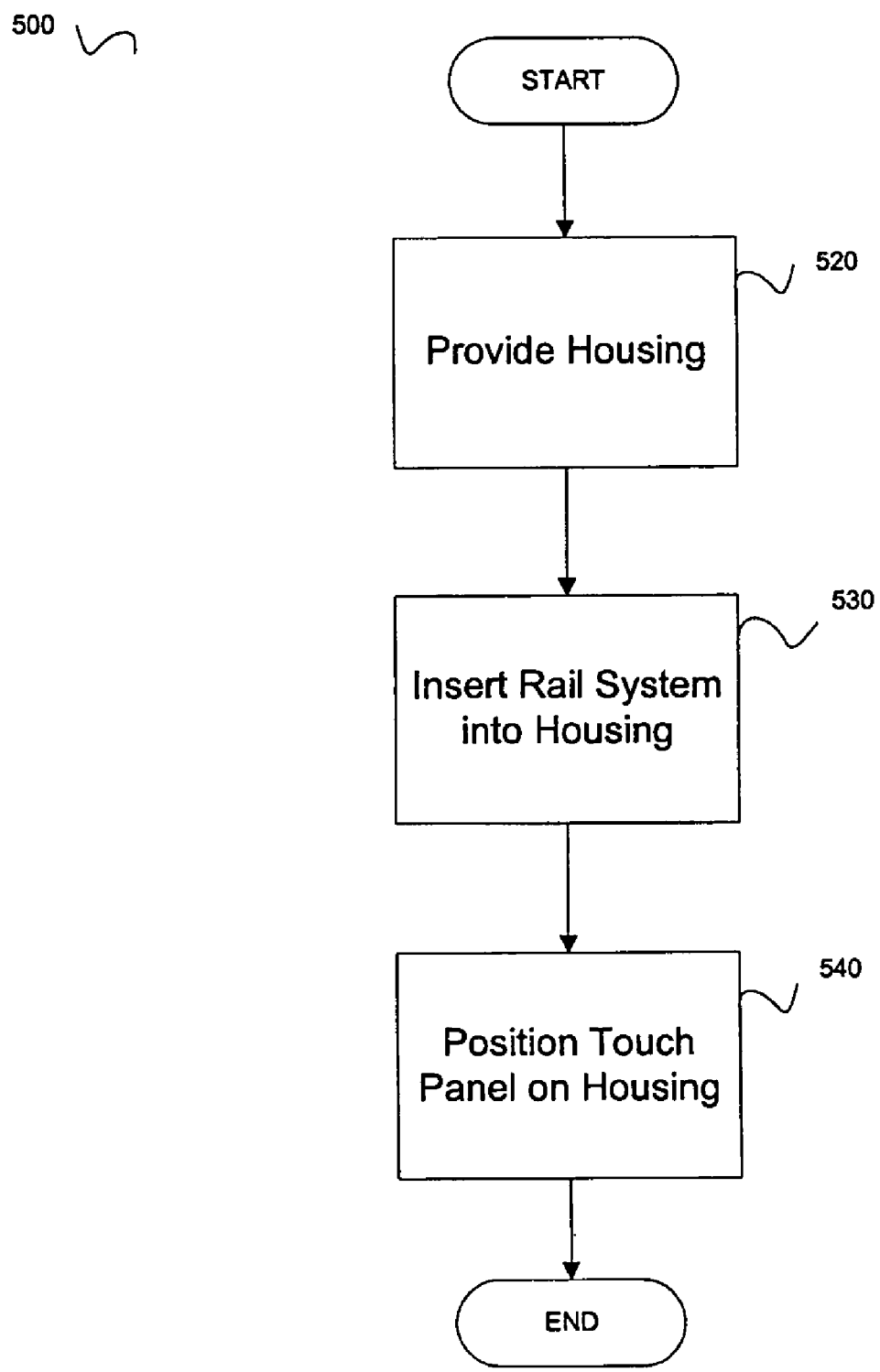
FIG. 5 shows an exemplary embodiment of a method for assembling the mobile device according to the present invention.

FIG. 5 shows an exemplary embodiment of a method 500 for assembling the MD 200 according to the present invention. The process 500 of FIG. 5 is described with reference to the exemplary embodiments of FIGS. 3a and 3b. In step 520, the housing 350 is provided. As described above, the housing 350 may be formed of the single piece of material, or from at least two assembled pieces of material. At least the predefined area of the housing 350 is transparent. The housing 350 may include the opening 352 for receiving the internal components of the MD 200.

In step 530, the rail system 320 is inserted into the housing 350. The rail system 320 includes the display 326 and the circuitry utilized during operation of the MD 200. According to the present invention, the display 326 is protected by the housing 350. The display 326 is preferably positioned on the rail system 320 in such a way that it will be aligned with the predefined area of the housing 350 once inserted.

In step 540, the touch panel 354 is positioned on the housing 350. The touch panel 354 may be connected to the circuitry prior to insertion of the rail system 320. The touch panel 354 is preferably aligned with the predefined area and the display 326. Once positioned, the touch panel 354 may be secured in place (e.g., using adhesive, compression, etc.). The cover/bezel 380 may optionally be provided to be placed over the touch panel 354 and to couple to the housing 350. The cover/bezel 380 should contain the cutout 382 to allow a user to access the touch panel 354.

Encasing the circuitry and display of a mobile device within a full monocoque housing 350 may provide increased durability and ruggedness to the MD 200. Such a design is made practical if at least the predefined area is formed of a transparent material. If an opaque material was used to form the housing, as is conventionally the case, a large opening must be created therein to expose the display. A general desire for smaller mobile devices with larger display screens required the opening to span nearly an entire width of the housing. The ruggedness of the housing would thereby be significantly compromised. The housing 350 formed in accordance with the present invention may retain maximum ruggedness due to the full monocoque form, while simultaneously allowing the user to view the display 326. Additionally, the housing 350 increases durability and useful life of the display 326 and the touch panel 354, because the display 326 is protected by the housing 350 while the touch panel 354 is fully supported.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A device, comprising:
   a housing being integrally formed and having a predefined transparent area having a predefined thickness, the housing having at least one opening; and
   a display arrangement situated inside of the housing, the display arrangement being inserted into the housing through the opening and aligned with the predefined transparent area such that the display arrangement is visible through the predefined transparent area.

2. The device of claim 1, further comprising:
   a touch panel attached to an external wall of the housing, the touch panel aligned with the display arrangement.

3. The device of claim 2, wherein the device is a mobile device.

4. The device of claim 2, further comprising:
   a bezel coupled to the housing.

5. The device of claim 4, wherein the bezel includes a cutout which is aligned with the touch panel.

6. The device of claim 2, wherein the touch panel is laterally supported on at least one side by a wall structure extending from the housing.

7. The device of claim 6, wherein the wall structure extends outwardly from the housing.

8. The device of claim 6, wherein a perimeter of the touch panel is laterally supported by a wall structure extending from the housing.

9. The device of claim 1, further comprising:
   a touch panel situated between an inside wall of the housing and the display arrangement.

10. The device of claim 1, wherein the housing is formed of one piece of material.

11. The device of claim 1, wherein the predefined transparent area includes at least a half of the entire housing.

12. The device of claim 1, wherein the device includes at least one of a bar code scanner, a digital imager, a GPS, a wireless transceiver and an RFID reader.

13. The device of claim 1, further comprising:
    a rail system situated within the housing.

14. The device of claim 13, wherein the housing includes a plurality of tracks, the rail system being inserted into the housing through the opening using the tracks.

15. The device of claim 13, wherein the rail system includes a rack, the rack situating the display device.

16. A method, comprising:
    forming a single-piece housing, the housing having a predefined transparent area having a predefined thickness and at least one opening;
    inserting, through the opening, a display arrangement into the housing; and
    aligning the display arrangement within the housing with the predefined transparent area such that the display arrangement is visible through the predefined transparent area.

17. The method of claim 16, further comprising:
    attaching a touch panel to an external wall of the housing; and
    aligning the touch panel with the display arrangement.

18. The method of claim 16, wherein the inserting step includes the following substeps:
    attaching the display arrangement to a rail system; and
    inserting the rail system into the housing through the opening using tracks of the housing.

19. A mobile arrangement, comprising:
    a single-piece housing having a predefined transparent area having a predefined thickness and at least one opening;
    a first means for inserting into tracks of the housing through the opening;
    a second means for displaying data, the second means being attached to the first means and aligned with the predefined transparent area such that displayed data is visible through the predefined transparent area; and
    a third means for processing the data, the third means being coupled to the second means and attached to the first means.

20. The arrangement of claim 19, further comprising:
    a fourth means for obtaining further data from user's touch of the third means, the fourth means being coupled to the third means.

* * * * *